(12) United States Patent
Musick

(10) Patent No.: US 9,975,437 B2
(45) Date of Patent: May 22, 2018

(54) CONDUCTOR WINDING TOOL AND BATTERY CHARGER HAVING THE SAME

(71) Applicant: Delphi Technologies, Inc., Troy, MI (US)

(72) Inventor: Steven A. Musick, Burton, OH (US)

(73) Assignee: Delphi Technologies Inc., Troy, MI (US)

( * ) Notice: Subject to any disclaimer, the term of this patent is extended or adjusted under 35 U.S.C. 154(b) by 190 days.

(21) Appl. No.: 14/976,420

(22) Filed: Dec. 21, 2015

(65) Prior Publication Data

US 2017/0174089 A1  Jun. 22, 2017

(51) Int. Cl.
*H02J 7/00* (2006.01)
*B60L 11/18* (2006.01)

(52) U.S. Cl.
CPC ....... *B60L 11/1816* (2013.01); *B60L 11/1824* (2013.01)

(58) Field of Classification Search
CPC .................. B60L 11/1816; B60L 11/1824
USPC ........................................... 320/109
See application file for complete search history.

(56) References Cited

U.S. PATENT DOCUMENTS

| | | | | |
|---|---|---|---|---|
| 2,414,136 A | * | 1/1947 | Bodendieck | H02G 7/14 57/10 |
| 3,625,262 A | * | 12/1971 | Baker | H01R 43/033 140/124 |
| 3,646,503 A | * | 2/1972 | Tachick | H02G 15/064 439/480 |
| 4,653,833 A | * | 3/1987 | Czubernat | H01R 13/72 191/12.4 |
| 5,183,420 A | * | 2/1993 | Hollander | H01R 13/72 439/4 |
| 6,282,289 B1 | * | 8/2001 | James | H04M 1/0202 379/446 |
| 6,364,287 B1 | * | 4/2002 | Rauch | F02D 9/1065 137/315.22 |
| 7,035,126 B1 | * | 4/2006 | Lanni | H01R 31/065 363/142 |
| 7,143,506 B2 | * | 12/2006 | Ooiwa | H02K 3/28 29/596 |
| 7,314,192 B2 | * | 1/2008 | Kitajima | A01K 89/01 242/321 |
| 8,281,845 B2 | * | 10/2012 | Seidel | E06B 9/40 160/313 |
| 9,187,291 B2 | * | 11/2015 | Alexandre | B65H 75/34 |
| 9,513,682 B2 | * | 12/2016 | Fleisig | G06F 1/26 |
| 2003/0008550 A1 | * | 1/2003 | Tse | H01R 13/72 439/501 |
| 2012/0212180 A1 | * | 8/2012 | Iida | B65H 75/4476 320/109 |
| 2014/0225441 A1 | * | 8/2014 | Mizuno | B60L 11/1816 307/66 |
| 2016/0336777 A1 | * | 11/2016 | Barnidge | H02J 7/0042 |

(Continued)

*Primary Examiner* — M'Baye Diao
(74) *Attorney, Agent, or Firm* — Robert J. Myers

(57) ABSTRACT

A conductor winding tool configured to stow a flexible electrical conductor, such as a conductor attached to an automotive battery charger. The tool includes a handle that is configured to be grasped by a human hand and a body defining an aperture through which the flexible electrical conductor passes. The tool is used to stow the flexible electrical conductor by winding the flexible electrical conductor into a storage device, such as a spool, reel, or storage bag.

12 Claims, 6 Drawing Sheets

(56) References Cited

U.S. PATENT DOCUMENTS

2017/0012449 A1* 1/2017 Organista .............. H02J 7/0042
2017/0136900 A1* 5/2017 Murata ............... B60L 11/1809

* cited by examiner

CONDUCTOR WINDING TOOL AND BATTERY CHARGER HAVING THE SAME

TECHNICAL FIELD OF THE INVENTION

The invention relates to a winding tool configured to stow a flexible electrical conductor.

BACKGROUND OF THE INVENTION

Battery chargers for electrical vehicles and plug-in hybrid electrical vehicle have charger cords running from the battery charger to a charging socket on the vehicle that may be up to 7 meters long to allow flexibility in positioning the vehicle relative to the battery charger. Portions of the charger cord typically lay on the ground surface when the charging cord is plugged into the vehicle's charging socket and may pick up dirt and fluids from the ground surface. The battery charger typically includes cord management features, such as spools or reels around which the cords are wound. If a human operator uses his/her hands to wind the charging cord around the spool, he/she may get soiled hands from dirt and/or fluids picked up by the charging cord as it lay on the ground surface. Therefore a means of stowing the charger cord that can avoid soiling the operator's hand is desired.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with a first embodiment of the invention, a conductor winding tool is provided. The conductor winding tool includes a handle configured to be grasped by a human hand, a body defining an aperture through which the flexible electrical conductor passes, and a means for receiving a flexible electrical conductor that is configured to stow the flexible electrical conductor by winding the flexible electrical conductor into the means using the conductor winding tool. The body is connected to the handle.

The aperture may define a generally circular shape. The handle may be T-shaped. The handle may be integral to the body or there may be a pivot disposed intermediate the handle and the body. In the latter case, the body is configured to spin relative to the handle about a pivot axis. The flexible electrical conductor may be connected to an automotive battery charger.

In accordance with a second embodiment, another conductor winding tool configured to wrap a flexible electrical conductor about a housing of an electrical device is provided. This conductor winding tool includes a handle that is configured to be grasped by a human hand and a body defining an aperture through which the flexible electrical conductor passes. The body connected to the handle.

The aperture may define a generally circular shape. The handle may be T-shaped. The handle may be integral to the body or there may be a pivot disposed intermediate the handle and the body. In the latter case, the body is configured to spin relative to the handle about a pivot axis. The flexible electrical conductor may be connected to an automotive battery charger. The housing may define a flange that is configured to receive the flexible electrical conductor as it is wound about the housing.

In accordance with a third embodiment, an automotive battery charger is provided. The automotive battery charger includes a flexible electrical conductor, a housing defining a flange configured to receive the flexible electrical conductor as it is wound about the housing, and a conductor winding tool configured to wind the flexible electrical conductor about the housing. The conductor winding tool has a handle that is configured to be grasped by a human hand and a body that defines a generally circular aperture through which the flexible electrical conductor passes. The body is connected to the handle.

The handle may be T-shaped. The handle may be integral to the body or there may be a pivot disposed intermediate the handle and the body. In the latter case, the body is configured to spin relative to the handle about a pivot axis. An edge of the circular aperture may be rounded.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

A tool that is configured to wind a flexible electrical conductor into a storage device, such as a spool, reel, or bag, is presented herein. A body portion of the conductor winding tool has an aperture through which the conductor passes. An operator can then gasp a handle portion of the tool with a hand and wrap the conductor into the storage device without having to directly touch the conductor with the hand. This provides the benefit of eliminating contact between an operator's hand and the flexible electrical conductor in case the conductor is dirty or soiled from laying on a ground surface.

Figure 1:
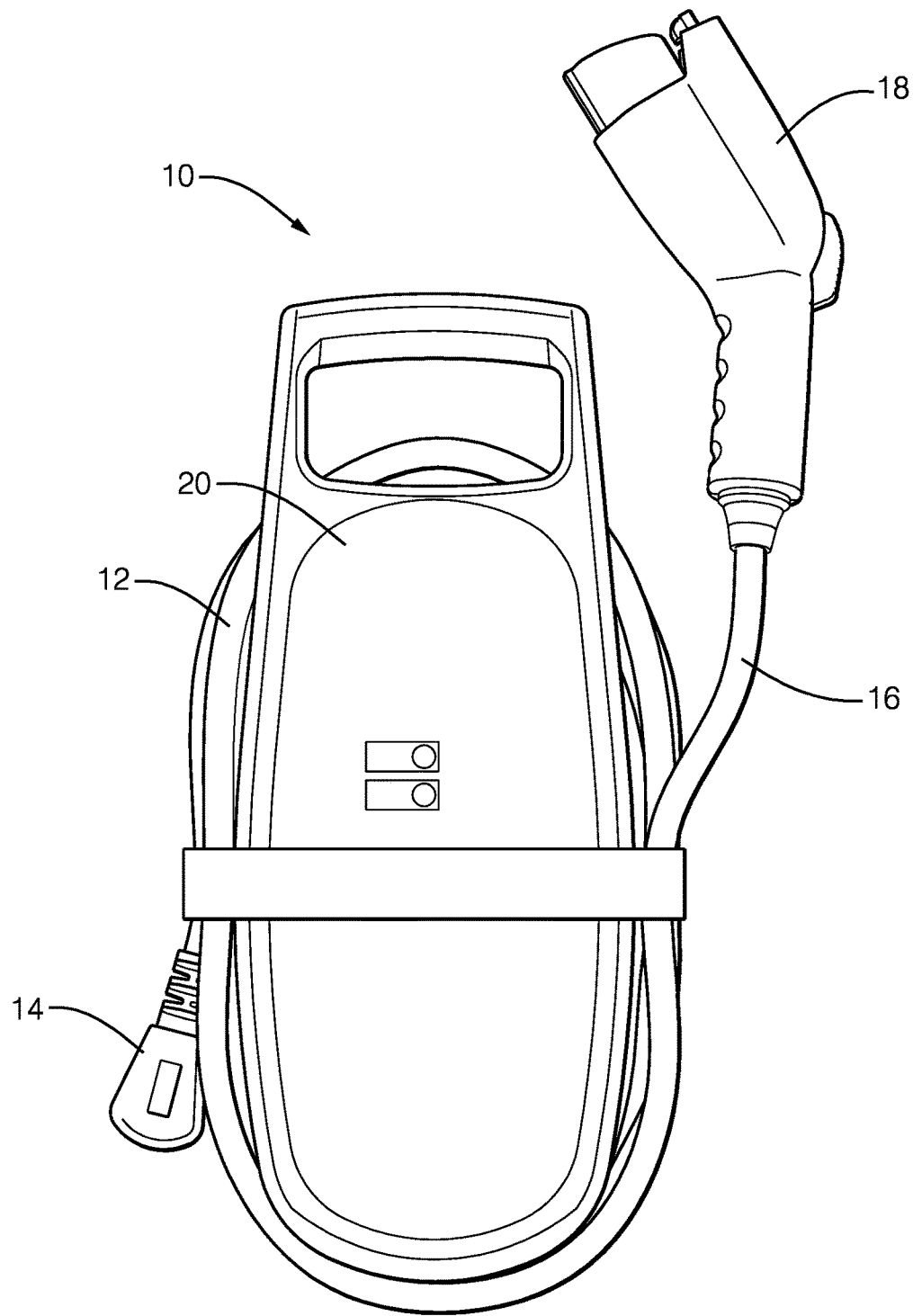
FIG. 1 is a top view of an electric vehicle charger with a flexible electrical conductor wrapped about the housing of the charger.
Figure 2:
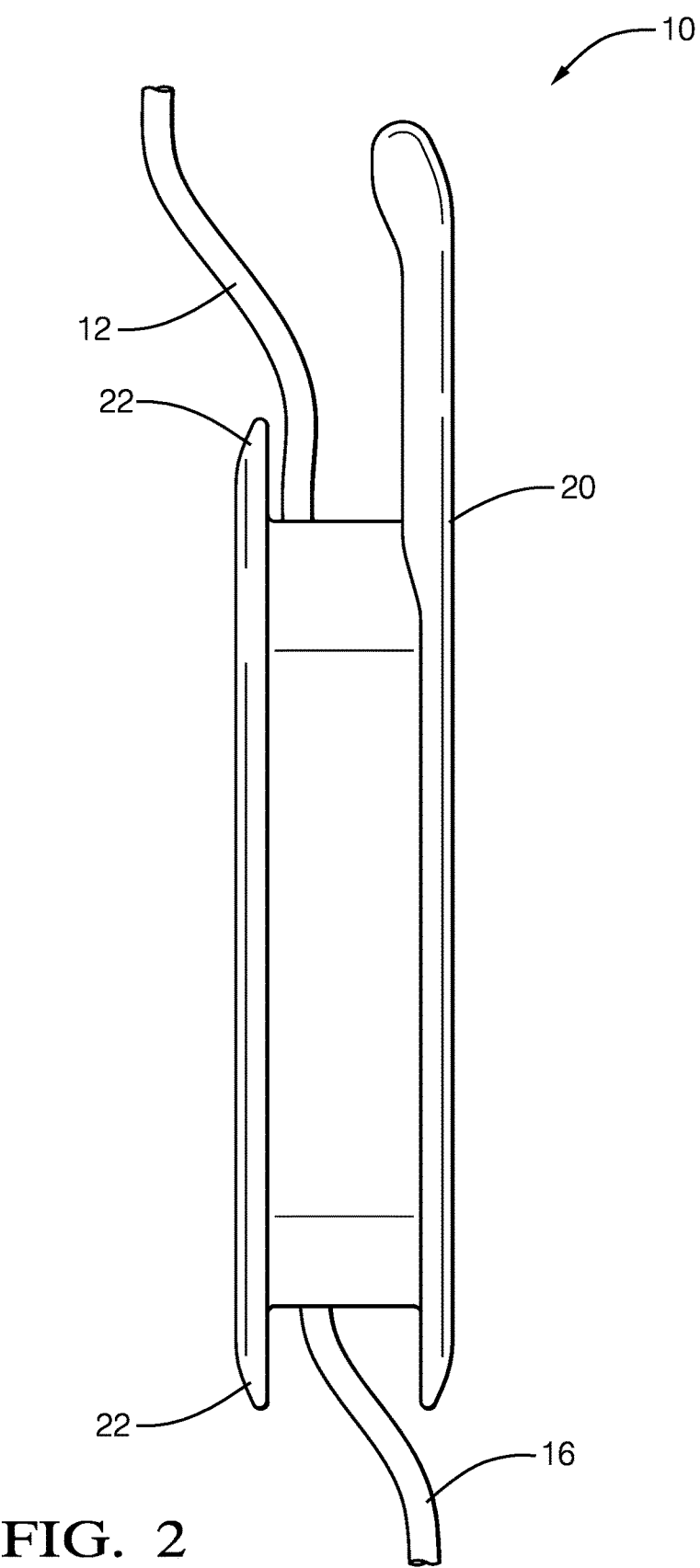
FIG. 2 is a side view of the electric vehicle charger of FIG. 1 the housing of which defines a flange configured to receive the flexible electrical conductor as it is wound about the charger.

FIGS. 1 and 2 illustrate a non-limiting example of an automotive battery charger 10, such as one used to charge the batteries for an electrical vehicle or a plug-in hybrid electrical vehicle (not shown). The battery charger 10 includes two flexible electrical conductors 12, 16. The first flexible electrical conductor 12 is a power supply cord 12 that is terminated with a power supply plug 14, such as a NEMA 5-15P or 6-20P plug that is configured to be connected to a corresponding power supply socket (not shown) such as a NEMA 5-15R or 6-20R, that supplies 120V AC or 220 V AC power to the battery charger 10. The second flexible electrical conductor 16 is a charging cord 16 that is terminated with a charging plug 18, such as an SAE J1772 complaint plug, that is configured to be connected to a corresponding charging socket (not shown), such as an SAE J1772 complaint socket, on the vehicle in order to supply electrical power from the battery charger 10 to the vehicle.

As shown in FIG. 2, the housing 20 of the battery charger 10 defines a pair of flanges 22 forming a reel or spool 22 that retains the power supply cord 12 and the charging cord 16 as they are wrapped about the spool 22 in order to stow the cords 12, 16. The cords 12, 16 are placed into the flanges 22 by an operator (not shown) winding the cords 12, 16 about the spool 22.

The battery charger 10 may be configured to be hung on a wall near the power socket in order to protect it from environmental hazards such as dirt, water, or other fluids that may be on the ground surface that could intrude into the housing 20 and damage the circuitry of the battery charger 10. Therefore, the length of the power supply cord 12 is typically about 2 meters (m). In order to provide flexibility in locating the vehicle relative to the battery charger 10, the charging cord 16 is longer than the power supply cord 12, typically about 7 meters.

Figure 3:
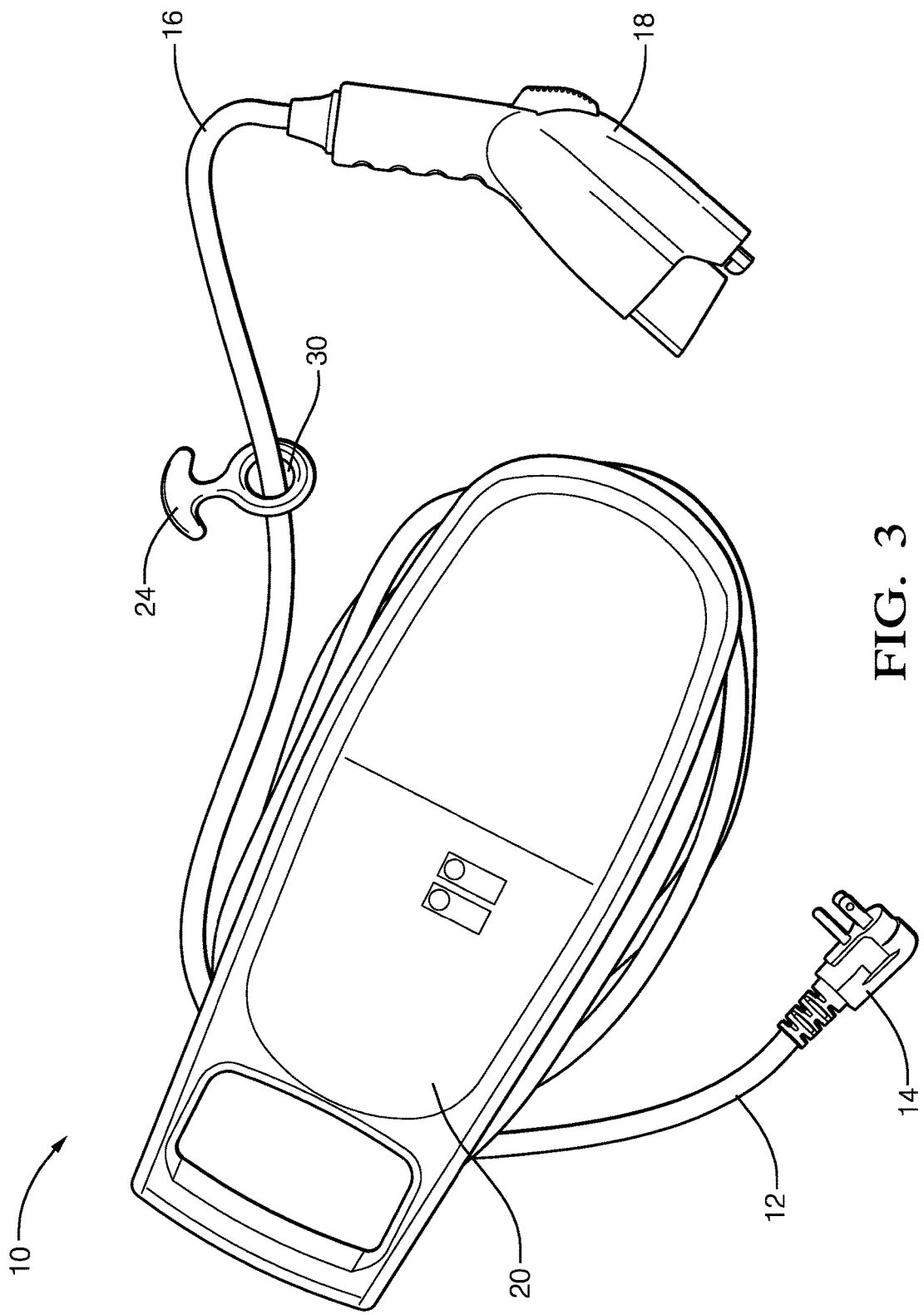
FIG. 3 is a top view of the electric vehicle charger of FIG. 1 with the flexible electrical conductor passing through an aperture in a conductor winding tool configured to stow the flexible electrical conductor according to a first embodiment.
Figure 4:
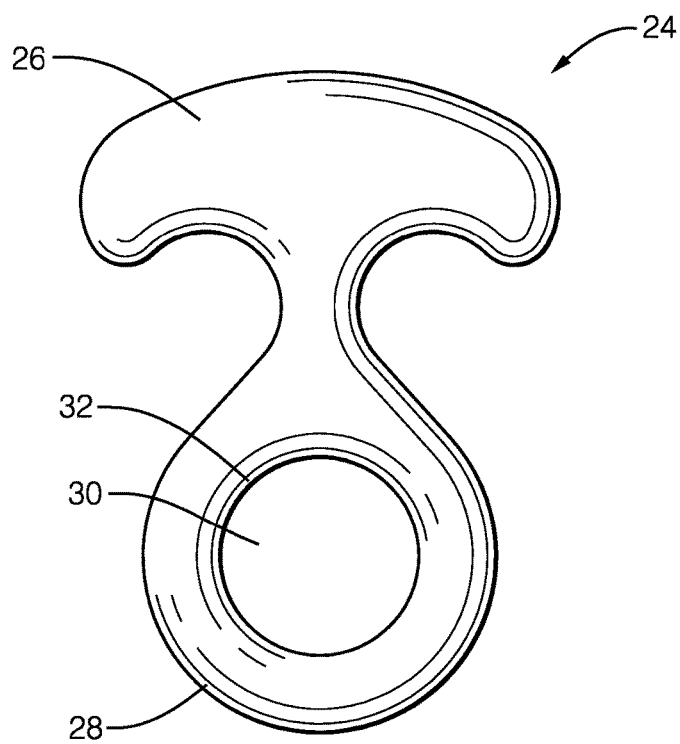
FIG. 4 is a top view of the conductor winding tool of FIG. 3 according to the first embodiment.

FIGS. 3 and 4 illustrate a non-limiting example of a tool 24 configured to stow a flexible electrical conductor 16 by wrapping the flexible electrical conductor 16 about the spool 22 formed in the housing 20 of the battery charger 10. As shown in FIG. 4, the tool 24 has a T-shaped handle 26 configured to be grasped by the hand of a human operator (not shown). Other handle shapes may also be envisioned. The tool 24 also includes a body 28 that is connected to the handle 26. The body 28 defines an aperture 30 through which the charging cord 16 passes as illustrated in FIG. 3. As shown in FIGS. 3 and 4, the handle 26 is integrally formed with the body 28 of the tool 24 in a single piece. In order to wrap the charging cord 16 around the spool 22, the operator grasps the handle 26 of the tool 24 and moves the tool 24 about the spool 22 as the charging cord 16 slides through the aperture 30. The tool 24 may also be used to unwrap the charging cord 16 from the spool 22. The tool 24 may be formed of a dialectic polymeric material.

The shape of the aperture 30 in the body 28 of the tool 24 is generally circular, although embodiments with other aperture shapes may also be envisioned. As used herein, generally circular includes circular, elliptical, oval, or ovoid (egg shaped) shapes. The edges 32 of the aperture 30 are smooth and rounded to reduce friction and abrasion of the charging cord 16 as it slides through the aperture 30. The edges 32 of the aperture 30 may be formed with low friction materials, such as polyamide (PA) (NYLON) or polytetrafluoroethylene (PFTE) (TEFLON). Alternatively, the edges of the aperture may incorporate friction reducing rollers.

Figure 5:
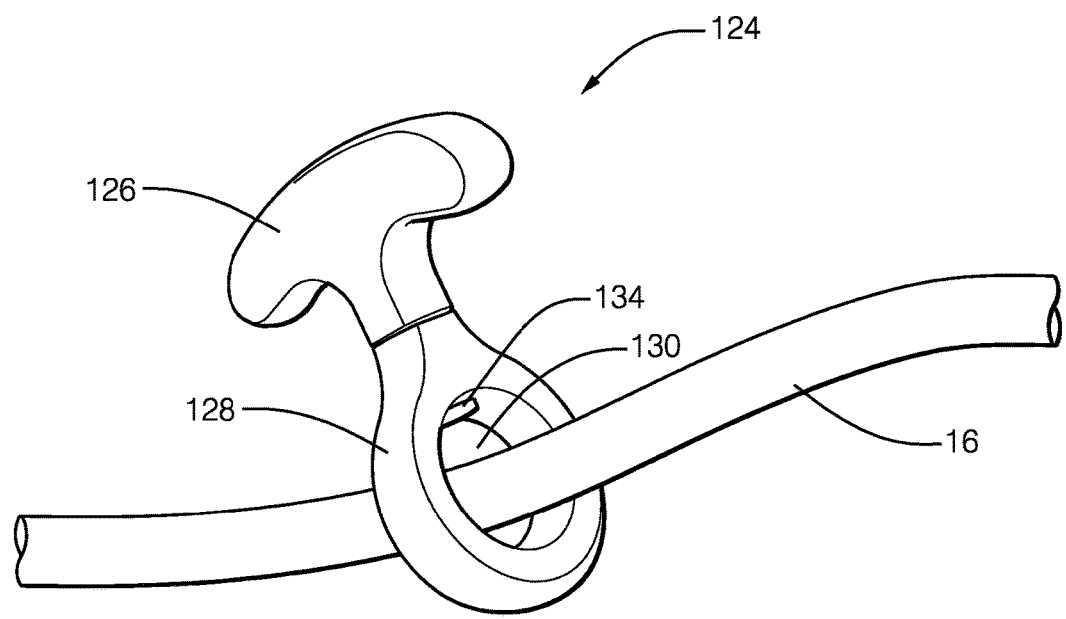
FIG. 5 is a top view of a conductor winding tool configured to stow the flexible electrical conductor wherein a body portion is articulated and configured to rotate relative to a handle portion according to a second embodiment.
Figure 6:
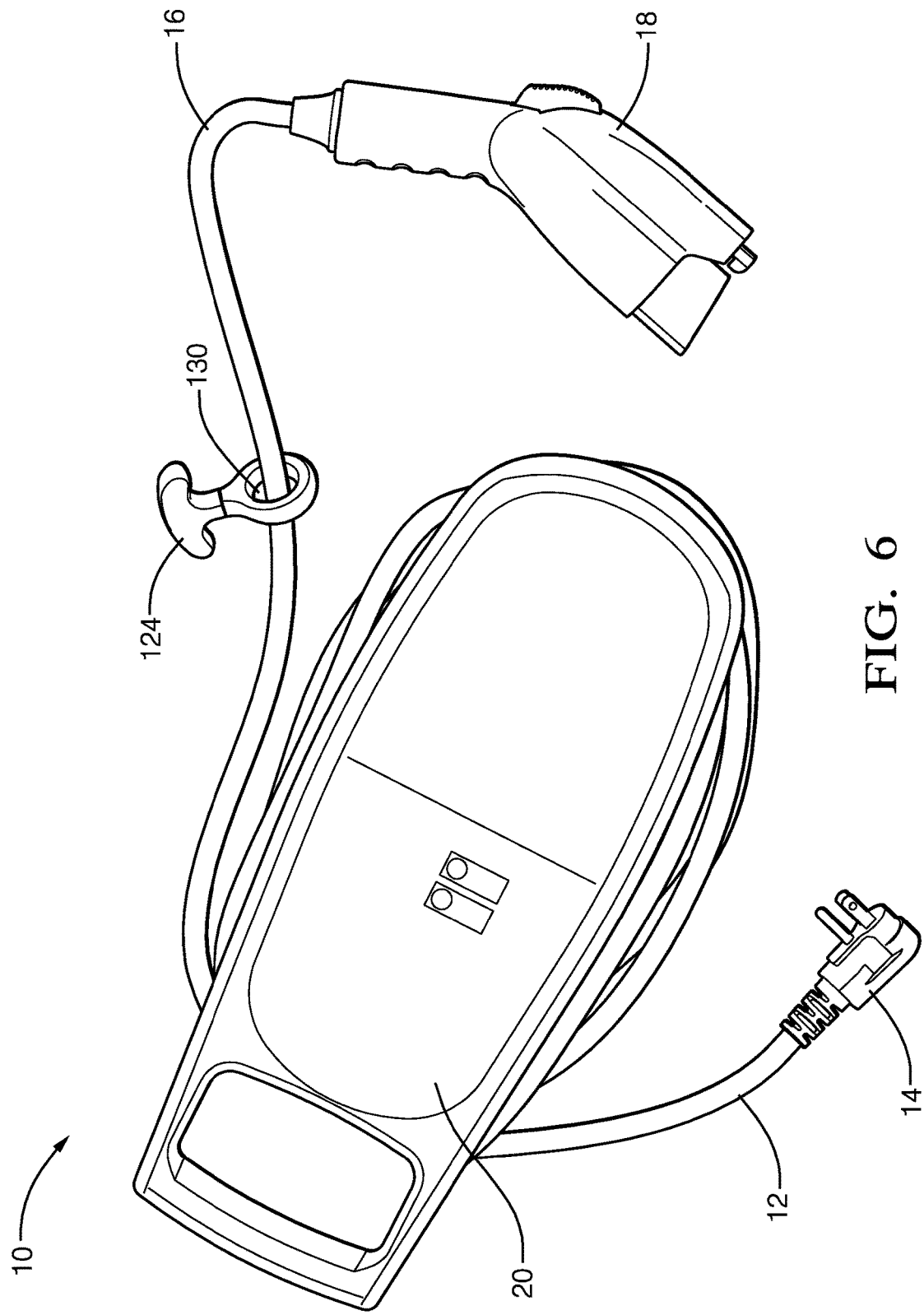
FIG. 6 is a top view of the electric vehicle charger of FIG. 1 with the flexible electrical conductor pass through an aperture in the conductor winding tool of FIG. 5 according to the second embodiment.

FIGS. 5 and 6 illustrate an alternative embodiment of the tool 124. The handle 126 and the body 128 of the tool 124 are two separate pieces joined by a pivot 134. The body 128 of the tool 124 is free to spin about the pivot 134 relative to the handle 126 about the pivot's axis X as the charger cord slides through the aperture 130. This provides the benefit of allowing the body 128 of the tool 124 to rotate as the charging cord 16 is wrapped about the spool 22, thus reducing twisting of the charging cord 16 as it is wound about the spool 22.

Figure 7:
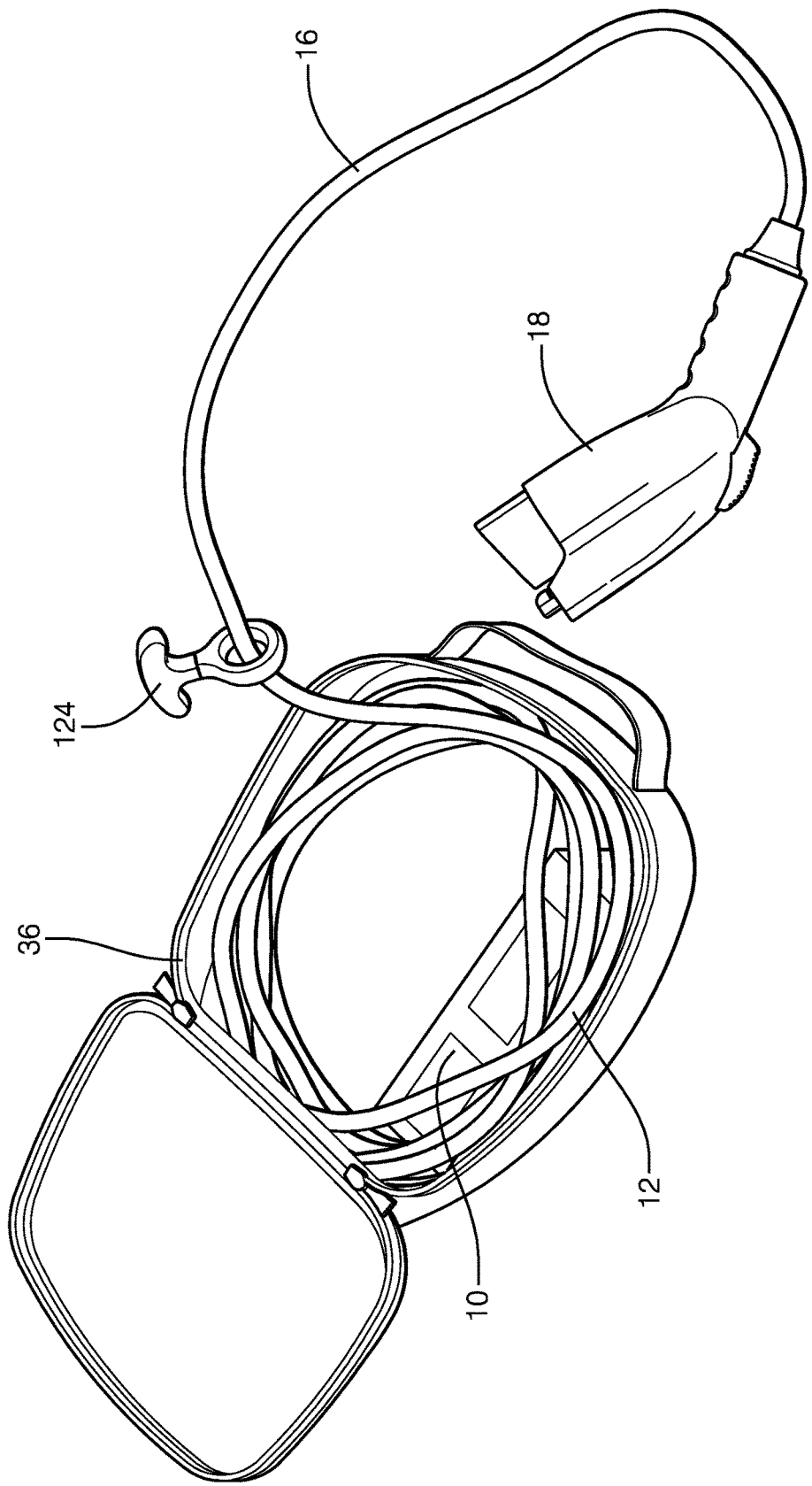
FIG. 7 is a top view of a storage bag configured to receive the flexible electrical conductor.

FIG. 7 illustrates an alternative means for stowing the charging cord 16. Rather than wrapping the charging cord 16 about a spool, the charging cord 16 is instead wrapped into a storage bag or sack 36.

While the examples presented here show a charging cord 16 wrapped about a spool 22 that is integral to the housing 20 of the battery charger 10, the charging cord 16 may alternatively be wrapped about a spool or reel that is separate from the housing of the battery charger. Alternatively or in addition, an identical tool 24, 124 may be used to stow the power supply cord 12.

While the examples presented here show a tool 24, 124 used to stow an electrical conductor attached to an automotive battery charger 10, alternative embodiments may be envisioned where the tool 24, 124 is used to stow flexible electrical conductors attached to other types of electrical devices or electrical extension cords. Further, other alternative embodiments of the tool 24, 124 may be used to stow other types of flexible conductors, such as fiber optic cables, fluid carrying hoses, or pneumatic hoses.

Accordingly a conductor winding tool 24, 124 and an automotive battery charger 10 incorporating such as tool 24, 124 is provided. The tool 24, 124 provides the benefit of allowing a human operator to stow a flexible conductor, such as a charging cord 16 of an automotive battery charger 10 around a spool 22 without requiring directly touching the charging cord 16 with a hand and avoid contact with dirt or fluids that may be on the charging cord 16 due to contact with a ground surface. The body 128 of the tool 124 may rotate about a pivot 134 relative to the handle 126 of the tool 124 to provide reduced twisting of the charging cord 16 as it is wrapped about the spool 22. Twisting of the charging cord 16 should be avoided in order to reduce the likelihood of damage to the charging cord 16.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

I claim:

1. A conductor winding tool configured to stow a flexible electrical conductor, comprising:
    a handle configured to be grasped by a human hand;
    a body defining an aperture through which the flexible electrical conductor passes, said body connected to the handle; and
    a means for receiving the flexible electrical conductor and configured to stow the flexible electrical conductor by winding the flexible electrical conductor into the means using the conductor winding tool, wherein a pivot is disposed intermediate the handle and the body and wherein the body is configured to spin relative to the handle about a pivot axis.

2. The conductor winding tool according to claim 1, wherein the aperture is characterized as having a generally circular shape.

3. The conductor winding tool according to claim 1, wherein the handle is T-shaped.

4. The conductor winding tool according to claim 1, wherein the flexible electrical conductor is connected to an automotive battery charger.

5. A conductor winding tool configured to wrap a flexible electrical conductor about a housing of an electrical device, comprising:

a handle configured to be grasped by a human hand; and a body defining an aperture through which the flexible electrical conductor passes, said body connected to the handle, wherein a pivot is disposed intermediate the handle and the body and wherein the body is configured to spin relative to the handle about a pivot axis.

6. The conductor winding tool according to claim 5, wherein the aperture is characterized as having a generally circular shape.

7. The conductor winding tool according to claim 5, wherein the handle is T-shaped.

8. The conductor winding tool according to claim 5, wherein the electrical device is an automotive battery charger.

9. The conductor winding tool according to claim 5, wherein the housing defines a flange configured to receive the flexible electrical conductor as it is wound about the housing.

10. An automotive battery charger, comprising:

a flexible electrical conductor;

a housing defining a flange configured to receive the flexible electrical conductor as it is wound about the housing; and a conductor winding tool configured to wind the flexible electrical conductor about the housing, said conductor winding tool having a handle configured to be grasped by a human hand and a body defining a generally circular aperture through which the flexible electrical conductor passes, wherein said body is connected to the handle, wherein a pivot is disposed intermediate the handle and the body and wherein the body is configured to spin relative to the handle about a pivot axis.

11. The automotive battery charger according to claim 10, wherein the handle is T-shaped.

12. The automotive battery charger according to claim 10, wherein an edge of the circular aperture is rounded.

\* \* \* \* \*